(12) United States Patent
Matthews et al.

(10) Patent No.: US 10,542,306 B2
(45) Date of Patent: *Jan. 21, 2020

(54) SYSTEMS AND METHODS FOR EXCLUDING CONSUMED CONTENT FROM A CONTENT PRESENTATION

(71) Applicant: ROVI GUIDES, INC., San Jose, CA (US)

(72) Inventors: Sean Matthews, Los Altos, CA (US); Benjamin H. Maughan, Pleasanton, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,262

(22) Filed: Oct. 2, 2018

(65) Prior Publication Data
US 2019/0110090 A1    Apr. 11, 2019

Related U.S. Application Data

(63) Continuation of application No. 15/726,935, filed on Oct. 6, 2017, now Pat. No. 10,123,062.

(51) Int. Cl.
| | | |
|---|---|---|
| *H04N 21/238* | (2011.01) | |
| *H04N 21/2389* | (2011.01) | |
| *H04N 21/858* | (2011.01) | |
| *H04N 21/232* | (2011.01) | |
| *H04N 21/258* | (2011.01) | |
| *H04N 21/845* | (2011.01) | |
| *H04N 21/8352* | (2011.01) | |
| *H04N 21/234* | (2011.01) | |
| *H04N 21/2668* | (2011.01) | |
| *G06K 9/00* | (2006.01) | |

(52) U.S. Cl.
CPC ... *H04N 21/23892* (2013.01); *G06K 9/00744* (2013.01); *G06K 9/00758* (2013.01); *H04N 21/232* (2013.01); *H04N 21/23418* (2013.01); *H04N 21/25891* (2013.01); *H04N 21/2668* (2013.01); *H04N 21/8352* (2013.01); *H04N 21/8456* (2013.01); *H04N 21/8586* (2013.01)

(58) Field of Classification Search
CPC .......... H04N 21/232; H04N 21/23892; H04N 21/25891; H04N 21/8586
See application file for complete search history.

(56) References Cited

U.S. PATENT DOCUMENTS

| | | | | |
|---|---|---|---|---|
| 6,239,794 B1 * | 5/2001 | Yuen | ................... | H04N 5/44543 348/565 |
| 6,564,378 B1 * | 5/2003 | Satterfield | .......... | H04N 5/44543 725/40 |

(Continued)

*Primary Examiner* — Nicholas T Corbo
(74) *Attorney, Agent, or Firm* — Haley Guiliano LLP

(57) ABSTRACT

System and method are disclosed herein for excluding consumed content from a content presentation. Specifically, fingerprints for each unique media asset included in a compilation of media content consumed by a user may be obtained and stored in a user's profile. Fingerprints for each unique media asset included in another compilation of media content may be generated and compared with fingerprints stored in the user's profile to determine which of the unique media assets in the other compilation have been consumed by the user. The second compilation may be presented to the user without the unique media assets that were consumed.

16 Claims, 8 Drawing Sheets

(56) References Cited

U.S. PATENT DOCUMENTS

| | | | | |
|---|---|---|---|---|
| 7,165,098 B1* | 1/2007 | Boyer | ............... | H04N 21/4782 |
| | | | | 709/219 |
| 7,761,892 B2* | 7/2010 | Ellis | .................. | H04N 5/44543 |
| | | | | 725/44 |
| 8,046,801 B2* | 10/2011 | Ellis | ....................... | H04N 7/163 |
| | | | | 725/58 |
| 2002/0174430 A1* | 11/2002 | Ellis | ....................... | G11B 27/34 |
| | | | | 725/46 |
| 2005/0251827 A1* | 11/2005 | Ellis | .................. | H04N 5/44543 |
| | | | | 725/47 |
| 2010/0153885 A1* | 6/2010 | Yates | ................... | G06F 3/0482 |
| | | | | 715/841 |

* cited by examiner

100

| Unique Media Asset 1 | Unique Media Asset 2 | Unique Media Asset 3 | Unique Media Asset 4 |
|---|---|---|---|
| Fingerprint Data | Fingerprint Data | Fingerprint Data | Fingerprint Data |

102 ⟶
104 ⟶

120

| Unique Media Asset 1 | Unique Media Asset 2 | Unique Media Asset 3 | Unique Media Asset 4 |
|---|---|---|---|
| Fingerprint Data | Fingerprint Data | Fingerprint Data | Fingerprint Data |

602 — Generate a first plurality of fingerprints for a first media content consumed by a first user, where the first media content includes a first compilation of a first plurality of unique media assets

604 — Store, in a profile associated with the first user, a fingerprint for each media asset in the first plurality of unique media assets

606 — Generate a second plurality of fingerprints for a second media content, where the second media content includes a second compilation of a second plurality of unique media assets different from the first plurality of unique media assets

608 — Compare each fingerprint in the second plurality of fingerprints with each fingerprint in the first plurality of fingerprints

610 — Identify, based on the comparing, a set of unique media assets that are in both the first plurality of unique media assets and the second plurality of unique media assets

612 — Generate for display the second media content without the set of unique media assets that are in both the first plurality of unique media assets and the second plurality of unique media assets.

FIG. 6

SYSTEMS AND METHODS FOR EXCLUDING CONSUMED CONTENT FROM A CONTENT PRESENTATION

CROSS-REFERENCE TO RELATED APPLICATIONS

This application is a continuation of U.S. patent application Ser. No. 15/726,935, filed Oct. 6, 2017, (allowed). The disclosure of which is hereby incorporated by reference herein in its entirety.

BACKGROUND OF THE INVENTION

The amount of content created by combining shorter media into longer compilations has increased over the last few years as it has become easier to acquire hardware and software to create these compilations. In addition, various systems exist that determine whether a specific user has consumed specific media. For example, current systems track media that a user is consuming and store the information. When the user has a chance to consume the media again, these systems are able to inform the user that the specific media asset has been consumed before, thus helping the user decide whether to consume the media again. However, these systems are not effective with compilations created by combining multiple media; thus, the user may wind up consuming the same media content again (e.g., some compilations may include large portions of content that is the same as other compilations that the user has already consumed). This may cause inconvenience to the user because the user doesn't want to consume the same media again.

SUMMARY

Therefore, system and method are disclosed herein for excluding consumed content from a content presentation. Specifically, fingerprints for each unique media asset included in a compilation of media content consumed by a user may be generated and stored in a user's profile. Fingerprints for each unique media asset included in another compilation of media content may be generated and compared with fingerprints stored in the user's profile to determine which of the unique media assets in the other compilation have been consumed by the user. The second compilation may be presented to the user without the unique media assets that were consumed.

In some aspects, a media guidance application may be used to perform the actions necessary to exclude consumed content from a content presentation. The media guidance application may reside on a user's equipment, on a server, or a combination of those devices. However, these actions may be performed outside of a media guidance application using a combination of hardware and software.

The media guidance application may receive multiple media fingerprints for a compilation of media content consumed by a user. Specifically, the media guidance application may generate a first plurality of fingerprints for a first media content consumed by a first user, where the first media content includes a first compilation of a first plurality of unique media assets. For example, the media guidance application may traverse the media content and generate a fingerprint at a specific time interval (e.g., every frame, every ten frames, every second, every ten seconds, twenty seconds, one minute, five minutes, or another suitable interval).

The media guidance application may identify fingerprints that belong to different unique media assets in the compilation. Specifically, the media guidance application may compare each fingerprint in the first plurality of fingerprints with a next sequential fingerprint in the first plurality of fingerprints. For example, the media guidance application may execute a routine to compare sequential fingerprints to determine whether the fingerprints correspond to the same unique media asset or not. For example, if two fingerprints match, the media guidance application may associate the matching fingerprints with the same media asset; if they don't, the media guidance application may associate those fingerprints with different media assets.

The media guidance application may generate a set of fingerprints for the media content such that the fingerprints in the set may correspond to one of the unique media assets. Specifically, the media guidance application may generate, based on comparing each fingerprint in the first plurality of fingerprints with the next sequential fingerprint in the first plurality of fingerprints, a first set of fingerprints, where each fingerprint in the first set of fingerprints is associated with a unique media asset in the first plurality of unique media assets. For example, the media guidance application may create a set that stores one fingerprint for each unique media asset. In some embodiments, the media guidance application may store several (e.g., a subset) fingerprints for each unique media asset.

The media guidance application may store, in a profile associated with the first user, the first set of fingerprints. For example, the media guidance application may store the fingerprints in a user's profile indicating that the fingerprints are for unique media assets that the user has consumed. The user's profile may be located on a user equipment device and/or a server.

The media guidance application may generate fingerprints for other media that the user is consuming or may consume in the future. Specifically, the media guidance application may generate a second plurality of fingerprints for a second media content, where the second media content includes a second compilation of a second plurality of unique media assets different from the first plurality of unique media assets. For example, the media guidance application may traverse a media asset that the user is about to consume and generate fingerprints from the media asset. In some embodiments, the media guidance application may generate the fingerprints at a specific time interval (e.g., one per frame, one per ten frames, every one second, every ten seconds, every twenty seconds, every one minute, or another suitable interval).

The media guidance application may identify fingerprints that belong to different unique media assets in the compilation. Specifically, the media guidance application may compare each fingerprint in the second plurality of fingerprints with a next sequential fingerprint in the second plurality of fingerprints. For example, the media guidance application may execute a routine to compare sequential fingerprints to determine whether the fingerprints correspond to the same unique media asset or not. If two fingerprints match, the media guidance application may associate the matching fingerprints with the same media asset; if they don't, the media guidance application may associate those fingerprints with different media assets.

The media guidance application may generate a set of fingerprints for the media content such that the fingerprints in the set may correspond to one of the unique media assets. Specifically, the media guidance application may generate, based on comparing each fingerprint in the second plurality of fingerprints with the next sequential fingerprint in the second plurality of fingerprints, a second set of fingerprints, where each fingerprint in the second set of fingerprints is associated with a unique media asset in the second plurality of unique media assets. For example, the media guidance application may create a set that stores one fingerprint for each unique media asset. In some embodiments, the media guidance application may store several (e.g., a subset) fingerprints for each unique media asset.

The media guidance application may compare fingerprints associated with each compilation to determine whether any unique media assets within the two compilations match. Specifically, the media guidance application may compare fingerprints in the second set with fingerprints in the first set. For example, if each set of fingerprints includes one fingerprint for each unique media asset in the corresponding compilation, the media guidance application may iterate through each fingerprint in the second set to compare the fingerprints in the second set with fingerprints of the first set. If one or more fingerprints match, the media guidance application may determine that the second media content has some of the same unique media assets as the first media content; thus, those unique media assets have already been consumed by the user.

The media guidance application may present the second compilation and exclude the already consumed content so the user doesn't have to consume it again. The media guidance application may generate for display the second media content without the unique media assets both in the first media content and in the second media content. For example, the media guidance application may skip the unique media assets included in the first media content that are also included in the second media content. In some embodiments, the media guidance application may remove the unique media assets included in the first media content that are also included in the second media content from the second media content.

In some embodiments, the media guidance application may determine the length of each unique media asset by taking the following actions. The media guidance application may compare a fingerprint in the first media content that matches the unique media asset with each fingerprint in the second media content. The media guidance application may store, as a start time for the unique media asset, a time within the second media content where the first fingerprint match is found and store, as the end time of the unique media asset, the time within the second media content when, chronologically, the last fingerprint matches the fingerprint in the first media content. It should be noted that, in order for a fingerprint to match another fingerprint, a perfect match is not necessary. If enough of the content matches, the fingerprints match. For example, each fingerprint may include a plurality of characteristics associated with the content of a particular unique media asset (e.g., luminance characteristics of video frames, transitions, frequency, color characteristics, edges, peaks, motion characteristics of those frames, various audio characteristics, and other suitable characteristics). When the fingerprints are compared, the corresponding characteristics are compared, thus, if the media guidance application determines that a threshold of characteristics match, fingerprints are determined to match. In some embodiments, those characteristics are reduced to a hash (e.g., using a hash function), and the media guidance application may determine that fingerprints match hashes of the characteristics match.

In some embodiments, the media guidance application may update the user's profile with fingerprints of unique media assets that the user has consumed as part of consuming new content. Specifically, the media guidance application may determine that first the user finished consuming the second media asset. In response to determining that the first user finished consuming the second media asset, the media guidance application may generate a subset of fingerprints for the second media content, where the subset of fingerprints includes fingerprints for unique media assets included in the second media content and is not included in the first media content, and store the subset of fingerprints in the profile associated with the first user. For example, if four out of six unique media assets in the second compilation were not consumed by the user (e.g., while consuming the first compilation), the media guidance application may, upon the user finishing consumption of the second compilation, store four fingerprints for the four unique media assets in the profile associated with the user. It should be noted that multiple fingerprints may be stored for each unique media asset.

In some embodiments, the media guidance application may generate the first plurality of fingerprints for the first media content by performing the following actions. The media guidance application may determine, based on a duration associated with the first media content, a plurality of points within the first media content for generating the plurality of fingerprints, and generate each fingerprint in the plurality of fingerprints at a corresponding point of the plurality of points. For example, the media guidance application may determine that the media content is one hundred minutes long and based on that determine that a fingerprint should be generated every minute (e.g., one fingerprint for every one percent of the media content). In some embodiments, the media guidance application may generate a fingerprint and compare the fingerprint with a previous fingerprint. If the two fingerprints match, the media guidance application may refrain from storing the previous fingerprint and store the new fingerprint. In some embodiments, the media guidance application may refrain from storing a new fingerprint and keep the previous fingerprint. In some embodiments, both fingerprints may be stored.

The media guidance application may compare each fingerprint in the first plurality of fingerprints with the next sequential fingerprint in the first plurality of fingerprints by performing the following actions. The media guidance application may retrieve a first fingerprint in the first plurality of fingerprints and a second fingerprint in the first plurality of fingerprints, where the first fingerprint and the second fingerprint are chronologically sequential. The media guidance application may compare content of the first fingerprint with content of the second fingerprint. For example, as the media guidance application generates fingerprints, the media guidance application may compare a newly generated fingerprint with a last previously generated fingerprint. It should be noted that in some embodiments, the comparison may be performed after all fingerprints have been generated.

The media guidance application may determine whether a predefined amount of the content of the first fingerprint matches the content of the second fingerprint. For example, the media guidance application may compare two fingerprints for two frames of a media asset. Because most frames are not identical, most fingerprints generated based on those frames will not have identical data within those fingerprints. However, fingerprints of frames within unique media assets are similar enough that a match may be determined. As described above, each fingerprint may include a plurality of characteristics associated with the content of a particular unique media asset (e.g., luminance characteristics of video frames, transitions, frequency, color characteristics, edges, peaks, motion characteristics of those frames, various audio characteristics, and other suitable characteristics). When the fingerprints are compared, the corresponding characteristics are compared, thus, if the media guidance application determines that a threshold of characteristics match, fingerprints are determined to match. In some embodiments, those characteristics are reduced to a hash (e.g., using a hash function), and the media guidance application may determine that fingerprints match hashes of the characteristics match. The media guidance application may, in response to determining that the predefined amount of the content of the first fingerprint matches the content of the second fingerprint, assign the first fingerprint and the second fingerprint to a first unique media asset. For example, the media guidance application may generate separate data structures for storing fingerprints of different unique media assets and store both fingerprints in the same data structure.

The media guidance application may, in response to determining that the predefined amount of the content of the first fingerprint does not match the content of the second fingerprint, assign the first fingerprint to a first unique media asset and the second fingerprint to a second unique media asset. For example, the media guidance application may store fingerprints for a second unique media asset in another data structure.

In some embodiments, the media guidance application may generate the first set of fingerprints by performing the following actions. The media guidance application may determine, based on comparing each fingerprint in the first plurality of fingerprints with the next sequential fingerprint in the first plurality of fingerprints, a number of unique media assets in the first media content, and generate a subset of fingerprints for each unique media asset in the first media content. The media guidance application may assign each fingerprint to a corresponding subset. For example, the media guidance application may generate a data structure for a first unique media asset (i.e., the first subset) and, when a fingerprint is generated, assign the fingerprint to the first subset. As the media guidance application continues to generate fingerprints and a new fingerprint is generated that does not match the previous fingerprint (e.g., the new fingerprint is for a new unique media asset), the media guidance application may generate a new data structure for a new subset of fingerprints. In some embodiments, the media guidance application may generate all fingerprints first and determine based on the fingerprints (e.g., by performing a comparison) how many unique media assets are included in a compilation and generate a data structure for each different subset of fingerprints before storing the fingerprints in the appropriate data structures (e.g., one data structure for fingerprints of a unique media asset).

In some embodiments, the media guidance application may compare the fingerprints in the second set with the fingerprints in the first set by performing the following actions. The media guidance application may generate a second set of fingerprints, where the second set of fingerprints includes a plurality of subsets, each subset including fingerprints for each unique media asset in the second media content. For example, the media guidance application may generate a similar subset of fingerprints for a second compilation as was generated for the first compilation. Specifically, each of the first set and the second set would include one or more data structures containing subsets of fingerprints, each subset including fingerprints for a unique media asset. It should be noted that each subset may be associated with its own data structure.

The media guidance application may select a first subset of fingerprints in the second set of fingerprints and a second subset of fingerprints in the first set of fingerprints and compare each fingerprint in the first subset with each fingerprint in the second subset. For example, the media guidance application may select a subset for a unique media asset in the second set and a subset for a unique media asset in the first set. The fingerprints in each subset may be compared to determine whether at least some of the fingerprints match.

In response to determining that a predetermined number of fingerprints in the first subset match with fingerprints in the second subset, the media guidance application may determine that the first subset matches the second subset. It should be noted that in some embodiments even a single fingerprint match could result in determining that the subsets belong to the same unique media asset. In some embodiments, a specific number or amount (e.g., fifty percent) of fingerprints may be required to find a match.

In some embodiments, the media guidance application may determine the plurality of unique media assets both in the first media content and in the second media content by taking the following actions. The media guidance application may store for the first set of fingerprints a first plurality of subsets, each subset in the first plurality including fingerprints for each unique media asset in the first media content. For example, the media guidance application may generate a data structure for the first set of fingerprints and a data structure for each subset representing each unique media asset. The media guidance application may link the data structure so they can be traversed.

The media guidance application may generate a second set of fingerprints, where the second set of fingerprints includes a second plurality of subsets, each subset including fingerprints for each unique media asset in the second media content. For example, the media guidance application may generate a data structure for the second set of fingerprints and a data structure for each subset representing each unique media asset. The media guidance application may link the data structures for the second set with data structures for each subset so they can be traversed.

The media guidance application may select a first subset from the first set of fingerprints and the second subset from the second set of fingerprints, and compare, in chronological order, each fingerprint in the second subset with each fingerprint in the first subset. For example, the media guidance application may iterate through each subset and compare fingerprints within the subsets in a chronological order.

The media guidance application may determine, based on comparing each fingerprint in the second subset with each fingerprint in the first subset, that a first fingerprint in the first subset matches a second fingerprint in the second subset. For example, as the media guidance application iterates through each subset comparing fingerprints, the media guidance application may identify two matching fingerprints. The media guidance application may store a first time corresponding to a time within the second media content when the second fingerprint was generated, where the first time represents a start time for a first unique media asset to exclude from presenting in the second media content. For example, when the first matching fingerprint is found within the second compilation, it may indicate that it is a start of a unique media asset. Thus, the media guidance application may store the time of the fingerprint so the unique media asset may be excluded from the presentation starting at the stored time.

The media guidance application may compare each fingerprint in the second subset with each fingerprint in the first subset. For example, the media guidance application may iterate through fingerprints for each subset (i.e., each unique media asset) in the first compilation and each subset (i.e., each unique media asset) in the second compilation and compare fingerprints within the subsets to determine whether any unique media assets match.

The media guidance application may store a second time corresponding to a last fingerprint in the second subset, where the second time represents an end time for the first unique media asset to exclude from presenting in the second media content. For example, the media guidance application may iterate through each fingerprint in the second subset to determine a time stamp on the last fingerprint and set that time stamp as the end time of the excluded unique media asset.

In some embodiments, the media guidance application may present the second compilation without the excluded unique media asset by performing the following actions. The media guidance application may generate for display the second media content without a segment corresponding to the start time and the end time representing the first unique media asset. For example, the media guidance application may skip the previously viewed unique media assets. In some embodiments, the media guidance application may modify the second compilation to remove the previously viewed unique media assets. This may be useful when these media assets are stored locally for the user to consume in order to save storage space.

In some embodiments, when a second user accesses media content consumed by the first user, the media guidance application may instead of generating a fresh set of fingerprints use the fingerprints already generated for the first user. Specifically, the media guidance application may determine that a second user, different from the first user, is accessing the second media content, and in response to determining that the second user, different from the first user, is accessing the second media content, generate a pointer, in a profile associated with the second user, to the second set of fingerprints. For example, if fingerprints for a television program were already generated and stored in a first user's profile, the media guidance application may create a pointer to those fingerprints instead of generating them again. Thus, the media guidance application may have a repository for fingerprints of different unique media assets that have been previously viewed by various users. Each user profile may include pointers to locations in the repository corresponding to the different unique media assets that those users have consumed. This type of configuration may save storage space (i.e., each user's profile will not need to store the fingerprints) and save processing power where new fingerprints don't need to be created.

In some embodiments, the media guidance application may, when storing, in a profile associated with the first user, the fingerprint for each media asset in the first plurality of unique media assets perform the following actions. The media guidance application may store the fingerprint for each media asset in the first plurality of media assets at a location accessible by a plurality of users, and store, in the profile associated with the user, a link to the location accessible by a plurality of users. For example, the media guidance application may store the fingerprints on a remote server and store a pointer in the user's profile to a location on the server where the fingerprints may be accessed.

It should be noted that the methods and system described herein may be applied to playlists of media assets. For example, an editor may generate a playlist of media assets (e.g., highlights of different sporting events). Instead of stitching together the different highlights into one media asset, the editor may generate a playlist of the different clips. If the media guidance application receives a command to play the playlist, the media guidance application may apply the same methods and systems as are applied to the compilation of media assets.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows an illustrative example of data structure that includes a set of fingerprints for media content that was consumed by a user and a set of fingerprints for media content that has not yet been consumed by the user, in accordance with some embodiments of the disclosure;

FIG. 6 is a flowchart of illustrative actions for excluding consumed content from a content presentation, in accordance with some embodiments of the disclosure;

DETAILED DESCRIPTION

Figure 2:
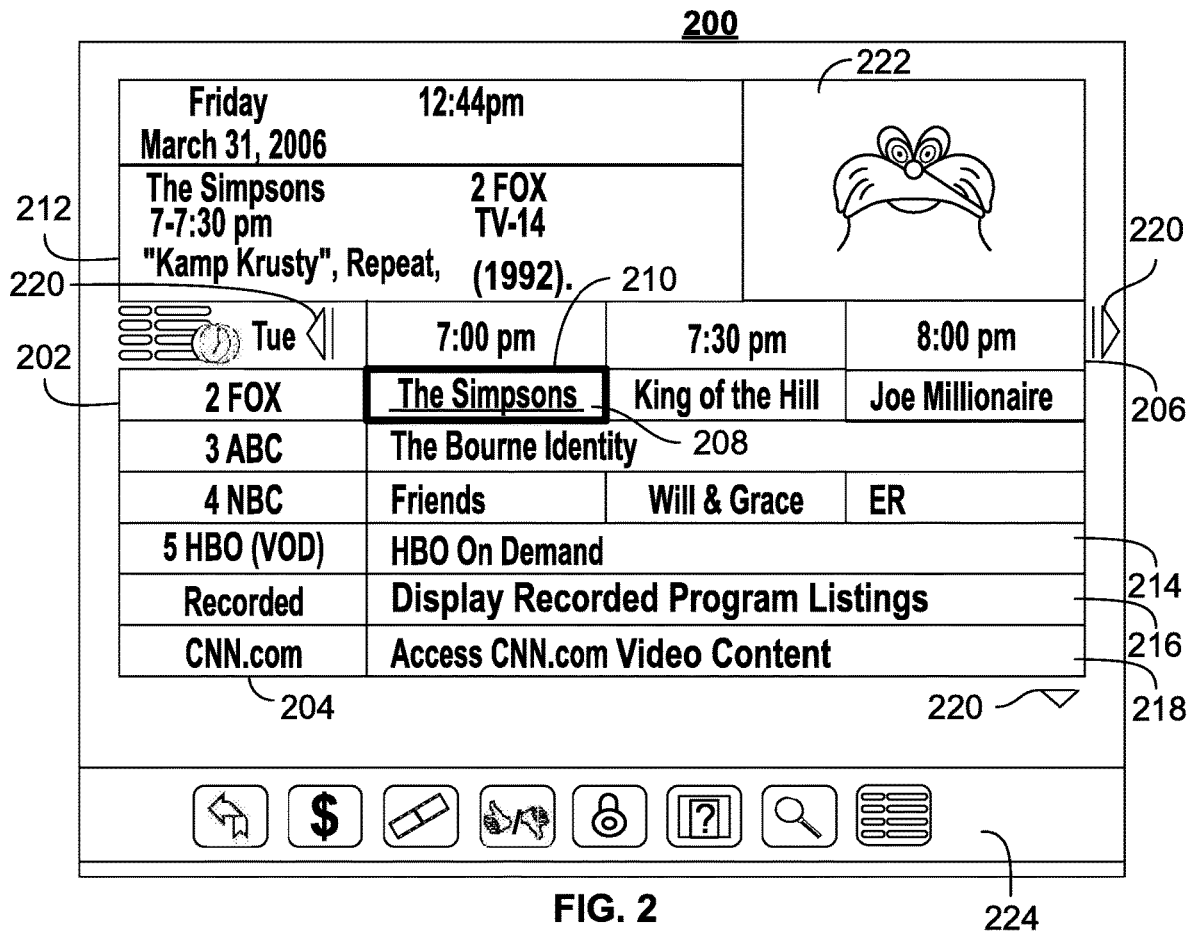
FIG. 2 shows an illustrative example of a display screen for use in accessing media content in accordance with some embodiments of the disclosure.

System and method are disclosed herein for excluding consumed content from a content presentation. Specifically, fingerprints for each unique media asset included in a compilation of media content consumed by a user may be generated and stored in a user's profile. Fingerprints for each unique media asset included in another compilation of media content may be generated and compared with fingerprints stored in the user's profile to determine which of the unique media assets in the other compilation have been consumed by the user. The second compilation may be presented to the user without the unique media assets that were consumed.

The media guidance application may receive multiple media fingerprints for a compilation of media content consumed by a user. Specifically, the media guidance application may generate a first plurality of fingerprints for a first media content consumed by a first user, where the first media content includes a first compilation of a first plurality of unique media assets. For example, the media guidance application may traverse the media content and generate a fingerprint at a specific time interval (e.g., every frame, every ten frames, every second, every ten seconds, twenty seconds, one minute, five minutes, or another suitable interval). Various algorithms are available that enable a system to generate a fingerprint of a media asset. For example, some algorithms use luminance characteristics of video frames others use transitions, frequency, color characteristics, edges, peaks, motion characteristics of those frames, and/or various audio characteristics. In some embodiments, it may be useful to execute a combination of algorithms so better results may be achieved.

The media guidance application may identify fingerprints that belong to different unique media assets in the compilation. Specifically, the media guidance application may compare each fingerprint in the first plurality of fingerprints with a next sequential fingerprint in the first plurality of fingerprint. For example, the media guidance application may iterate through the first plurality of fingerprints and execute a routine to compare sequential fingerprints. The routine may take as input two fingerprints and run a comparison algorithm on the fingerprints. The routine may output an indication whether the fingerprints match. This operation may be repeated on every pair of sequential fingerprints and the results may be stored.

The media guidance application may generate a set of fingerprints for the media content such that the fingerprints in the set may correspond to one of the unique media assets. Specifically, the media guidance application may generate, based on comparing each fingerprint in the first plurality of fingerprints with the next sequential fingerprint in the first plurality of fingerprints, a first set of fingerprints, where each fingerprint in the first set of fingerprints is associated with a unique media asset in the first plurality of unique media assets. For example, the media guidance application may generate data structure 100 of FIG. 1 and store fingerprint data in fields 104 with fields 102 storing an identifier of a unique media asset that the fingerprint data is associated with. The media guidance application may initialize data structure 100 with only one pair of fields 102 and 104 (i.e., one field 102 and one field 104). The media guidance application may iterate through the data that indicates whether two fingerprints match, and every time there is a match, store the matching fingerprints in the initialized field 104. However, when two fingerprints do not match, the media guidance application may generate a new pair of fields 102 and 104 (e.g., for a next unique media asset) and store the first fingerprint in the first pair of fields 102 and 104 and store the second fingerprint (i.e., the sequential non-matching fingerprint) in the newly generated field 104. In some embodiments, the media guidance application may store one fingerprint for each unique media asset. However, in other embodiments, the media guidance application may store multiple fingerprints for each unique media asset. In yet some embodiments, the media guidance application may combine characteristics of multiple fingerprints into a single fingerprint that may be compared.

The media guidance application may store, in a profile associated with the first user, the first set of fingerprints. For example, the media guidance application may store data structure 100 in the user's profile. In some embodiments, the media guidance application may extract the information from data structure 100 and store the information in a different format in the user's profile. The media guidance application may be configured to transform the fingerprint data in fields 104 and media asset identifier data in field 102 into a proper format. The user's profile may be located on a user equipment device and/or a server.

The media guidance application may generate fingerprints for other media that the user is consuming or may consume in the future. Specifically, the media guidance application may generate a second plurality of fingerprints for a second media content, where the second media content includes a second compilation of a second plurality of unique media assets different from the first plurality of unique media assets. For example, the media guidance application may traverse the media content and generate a fingerprint at a specific time interval (e.g., every ten seconds, twenty seconds, one minute, five minutes, or another suitable interval). Various algorithms are available that enable a system to generate a fingerprint of a media asset. For example, some algorithms use luminance characteristics of video frames; others use transitions, frequency, color characteristics, edges, peaks, motion characteristics of those frames, and/or various audio characteristics. In some embodiments, it may be useful to execute a combination of algorithms so better results may be achieved.

The media guidance application may identify fingerprints that belong to different unique media assets in the compilation. Specifically, the media guidance application may compare each fingerprint in the second plurality of fingerprints with a next sequential fingerprint in the second plurality of fingerprints. For example, the media guidance application may iterate through the second plurality of fingerprints and execute a routine to compare sequential fingerprints. The routine may take as input two fingerprints and run a comparison algorithm on the fingerprints. The routine may output an indication whether the fingerprints match. This operation may be repeated on every pair of sequential fingerprints and stored.

The media guidance application may generate a set of fingerprints for the media content such that the fingerprints in the set may correspond to one of the unique media assets. Specifically, the media guidance application may generate, based on comparing each fingerprint in the second plurality of fingerprints with the next sequential fingerprint in the second plurality of fingerprints, a second set of fingerprints, where each fingerprint in the second set of fingerprints is associated with a unique media asset in the second plurality of unique media assets. For example, the media guidance application may generate data structure 120 of FIG. 1 and store fingerprint data in fields 124 with fields 122, storing an identifier of a unique media asset that the fingerprint data is associated with. The media guidance application may initialize data structure 120 with only one pair of fields 122 and 124 (i.e., one field 122 and one field 124). The media guidance application may iterate through the data that indicates whether two fingerprints match and every time there is a match store the matching fingerprints in the initialized field 124. However, when two fingerprints do not match, the media guidance application may generate a new pair of fields 122 and 124 (e.g., for a next unique media asset) and store the first fingerprint in the first pair of fields 122 and 124 and store the second fingerprint (i.e., the sequential non-matching fingerprint in the newly generated) in the newly generated field 124. It should be noted that each fingerprint may only be stored once. In some embodiments, the media guidance application may store one fingerprint for each unique media asset. However, in other embodiments, the media guidance application may store multiple fingerprints for each unique media asset. In yet some embodiments, the media guidance application may combine characteristics of multiple fingerprints into a single fingerprint that may be compared.

The media guidance application may compare fingerprints associated with each compilation to determine whether any unique media assets within the two compilations match. Specifically, the media guidance application may compare fingerprints in the second set with fingerprints in the first set. For example, if each field 104 and each field 124 includes one fingerprint for each unique media asset in the corresponding compilation, the media guidance application may iterate through each fingerprint (i.e., each field 124) and compare the fingerprint data with fingerprint data in each field 104. If one or more fingerprints match, the media guidance application may store identifier 122 that corresponds to a fingerprint that matches as a unique media asset that the user has already consumed. It should be noted that the media guidance application may store the identifier in the user's profile such that data identifying the unique media asset for the second media content that is associated with the user indicates a match.

The media guidance application may present the second compilation and exclude the already consumed content so the user doesn't have to consume it again. The media guidance application may generate for display the second media content without the unique media assets both in the first media content and in the second media content. For example, the media guidance application may retrieve a list of unique media assets from the user profile that are marked as already viewed and skip the time interval in the playback when those media assets appear. In some embodiments, the media guidance application may remove the time intervals corresponding to unique media assets that have matched and store the media content without those segments.

In some embodiments, the media guidance application may determine the length of each unique media asset by comparing the fingerprint in the first media content with each fingerprint in the second media content and storing, as a start time of each unique media asset, the time within the second media content where the first fingerprint match is found and storing, as the end time of each unique media asset, the time within the second media content when, chronologically, the last fingerprint matches the fingerprint in the first media content. It should be noted that in order for a fingerprint to match another fingerprint a perfect match between the contents of the fingerprints is not necessary. As described above, each fingerprint may include a plurality of characteristics associated with the content of a particular unique media asset (e.g., luminance characteristics of video frames, transitions, frequency, color characteristics, edges, peaks, motion characteristics of those frames, various audio characteristics, and other suitable characteristics). When the fingerprints are compared, the corresponding characteristics are compared, thus, if the media guidance application determines that a threshold of characteristics match, fingerprints are determined to match. In some embodiments, those characteristics are reduced to a hash (e.g., using a hash function), and the media guidance application may determine that fingerprints match hashes of the characteristics match.

In some embodiments, the media guidance application may update the user's profile with fingerprints of unique media assets that the user has consumed as part of consuming new content. Specifically, the media guidance application may determine that first the user finished consuming the second media asset. In response to determining that the first user finished consuming the second media asset, the media guidance application may generate a subset of fingerprints for the second media content, where the subset of fingerprints includes fingerprints for unique media assets included in the second media content and is not included in the first media content, and store the subset of fingerprints in the profile associated with the first user. For example, the media guidance application may generate sets of fingerprints (e.g., data structure 120) for each media asset that the user consumes. The media guidance application may store the set (e.g., data structure 120) in a user's profile. In some embodiments, the media guidance application may extract the unique media asset identifier data 122 and fingerprint data 124 from the data structure and store the data in the user's profile with a link between the corresponding identifier and fingerprint data.

In some embodiments, the media guidance application may generate the first plurality of fingerprints for the first media content by performing the following actions. The media guidance application may determine, based on a duration associated with the first media content, a plurality of points within the first media content for generating the plurality of fingerprints, and generate each fingerprint in the plurality of fingerprints at a corresponding point of the plurality of points. For example, the media guidance application may determine a total length of the media content and identify points within the media content for fingerprint generation. In one example, if the media content is under sixty minutes, the media guidance application may generate a fingerprint every minute or every 30 seconds. However, if the media content is over sixty minutes in length, the media guidance application may generate one hundred fingerprints spread evenly within the media content. Other frequency of fingerprint generation may be created as well (e.g., every thirty seconds). In some embodiments, the media guidance application may generate a fingerprint and compare the fingerprint with a previous fingerprint; if the two fingerprints match, the media guidance application may refrain from storing the previous fingerprint and store the new fingerprint. In some embodiments, the media guidance application may refrain from storing a new fingerprint and keep the previous fingerprint. In some embodiments, both fingerprints may be stored.

The media guidance application may compare each fingerprint in the first plurality of fingerprints with the next sequential fingerprint in the first plurality of fingerprint by performing the following actions. The media guidance application may retrieve a first fingerprint in the first plurality of fingerprints and a second fingerprint in the first plurality of fingerprints, where the first fingerprint and the second fingerprints are chronologically sequential, and compare content of the first fingerprint with content of the second fingerprint. For example, as the media guidance application generates fingerprints, the media guidance application may keep the last generated fingerprint in memory (e.g., in data structure 100 stored in volatile memory) and compare a newly generated fingerprint with the fingerprint in memory. It should be noted that in some embodiments, the comparison may be performed after all fingerprints have been generated. Thus, the media guidance application may retrieve the fingerprint from memory just before comparison.

The media guidance application may determine whether a predefined amount of the content of the first fingerprint matches the content of the second fingerprint. For example, the media guidance application may compare two fingerprints for two frames of the media content. Because most frames are not identical, most fingerprints generated based on those frames will not have identical data within those fingerprints. However, fingerprints of frames within unique media assets are similar enough that a match may be determined. For example, if fingerprints are generated by executing a hash algorithm on pixels of frames, two consecutive frames may not be identical (e.g., two frames may have ninety-five percent of pixels within those frames that are identical). Thus, the hashes for the two frames may be slightly different. In these embodiments, the media guidance application may determine a match in fingerprints if the two hashes are within a threshold difference of each other. It should be noted that in some embodiments different way of generating fingerprints may be implemented that require perfect matches between the fingerprints. The media guidance application may, in response to determining that the predefined amount of the content of the first fingerprint matches the content of the second fingerprint, assign the first fingerprint and the second fingerprint to a first unique media asset. For example, the media guidance application may compare different data within the fingerprints (e.g., luminance number, color characteristics, edges, peaks, motion characteristics of those frames, various audio characteristics, and/or other suitable data). If two fingerprints have enough characteristics that are similar, then the media guidance application may determine that the fingerprints match. If a match is found, the media guidance application may store both fingerprints, for example, in data structure 100 in corresponding fields 102 and 104.

The media guidance application may, in response to determining that the predefined amount of the content of the first fingerprint does not match the content of the second fingerprint, assign the first fingerprint to a first unique media asset and the second fingerprint to a second unique media asset. If a match is not found, the media guidance application may store one fingerprint, in a field 104 corresponding to one identifier 102 and a second fingerprint in a different field 104 corresponding to a second identifier 102. In some embodiments, the media guidance application may generate new fields 102 and 104 on the fly, and in some embodiments the fields may be pre-generated.

In some embodiments, the media guidance application may generate the first set of fingerprints by performing the following actions. The media guidance application may determine, based on comparing each fingerprint in the first plurality of fingerprints with the next sequential fingerprint in the first plurality of fingerprints, a number of unique media assets in the first media content, and generate a subset of fingerprints for each unique media asset in the first media content. The media guidance application may assign each fingerprint to a corresponding subset. For example, the media guidance application may generate a data structure (e.g., a data structure that includes one field 102 and one field 104) for a first unique media asset (i.e., the first subset) and, when a fingerprint is generated, assign the fingerprint to the first subset (e.g., copy the fingerprint into field 104 or copy a link to the fingerprint into field 104). As the media guidance application continues to generate fingerprints and a new fingerprint is generated that does not match the previous fingerprint (i.e., the new fingerprint is for a new unique media asset), the media guidance application may generate a new data structure (e.g., data structure including a new field 102 and a new field 104) for a new subset of fingerprints. In some embodiments, the media guidance application may generate all fingerprints first and determine based on the fingerprints (e.g., by performing a comparison) how many unique media assets are included in a compilation and generate a data structure for each different subset of fingerprints (e.g., a data structure including a field 102 and a field 104) before storing the fingerprints in the appropriate data structures.

In some embodiments, the media guidance application may compare the fingerprints in the second set with the fingerprints in the first set by performing the following actions. The media guidance application may generate a second set of fingerprints, where the second set of fingerprints includes a plurality of subsets, each subset including fingerprints for each unique media asset in the second media content. For example, the media guidance application may generate a similar subset of fingerprints for a second compilation as was generated for the first compilation. Specifically, each of the first set and the second set would include one or more data structures (e.g., data structure 100 and 120) containing subsets of fingerprints (e.g., each subset including a field 102 and a field 104 or a field 122 and a field 124) each subset including fingerprints for a unique media asset.

The media guidance application may select a first subset of fingerprints in the second set of fingerprints and a second subset of fingerprints in the first set of fingerprints and compare each fingerprint in the first subset with each fingerprint in the second subset. For example, the media guidance application may select a pair of fields 102 and 104 corresponding to unique media asset 1 of data structure 100, and a pair of fields 122 and 124 corresponding to unique media asset 1 of data structure 120.

In response to determining that a predetermined number of fingerprints in the first subset match with fingerprints in the second subset, the media guidance application may determine that the first subset matches the second subset. It should be noted that in some embodiments even a single fingerprint match could result in determining that the subsets belong to the same unique media asset. In some embodiments, a specific number or amount (e.g., fifty percent) of fingerprints may be required to find a match.

In some embodiments, the media guidance application may determine the plurality of unique media assets both in the first media content and in the second media content by taking the following actions. The media guidance application may store for the first set of fingerprints a first plurality of subsets, each subset in the first plurality including fingerprints for each unique media asset in the first media content. As discussed above, data structure 100 may include subsets (e.g., four subsets), each subset corresponding to a unique media asset.

The media guidance application may generate a second set of fingerprints, where the second set of fingerprints includes a second plurality of subsets, each subset including fingerprints for each unique media asset in the second media content. As discussed above, data structure 120 may include subsets (e.g., four subsets), each subset corresponding to a unique media asset. The media guidance application may link the data structures for the second set with data structures for each subset so they can be traversed. For example, unique media asset 1 of data structure 120, together with the corresponding fingerprint data, may be stored as a data structure. Each of the four data structures shown within data structure 120 may be linked together to create data structure 120.

The media guidance application may select a first subset from the first set of fingerprints and the second subset from the second set of fingerprints, and compare, in chronological order, each fingerprint in the second subset with each fingerprint in the first subset. For example, the media guidance application may iterate through each subset (e.g., each of corresponding fields 104 and 124), and compare fingerprints within the subsets in a chronological order.

The media guidance application may determine, based on comparing each fingerprint in the second subset with each fingerprint in the first subset, that a first fingerprint in the first subset matches a second fingerprint in the second subset. For example, as the media guidance application iterates through each subset comparing fingerprints, the media guidance application may identify two matching fingerprints. The media guidance application may store a first time corresponding to a time within the second media content when the second fingerprint was generated, where the first time represents a start time for a first unique media asset to exclude from presenting in the second media content. For example, when the first matching fingerprint is found within the second compilation, it may indicate that it is a start of a unique media asset. Thus, the media guidance may store the time of the fingerprint so the unique media asset may be excluded from the presentation starting at the stored start time.

The media guidance application may compare each fingerprint in the second subset with each fingerprint in the first subset. For example, the media guidance application may iterate through fingerprints for each subset (i.e., each unique media asset) in the first compilation and each subset (i.e., each unique media asset) in the second compilation and compare fingerprints within the subsets to determine whether any unique media assets match.

The media guidance application may determine, based on comparing each fingerprint in the second subset with each fingerprint in the first subset, that a first fingerprint in the first subset matches a second fingerprint in the second subset, and store a first time corresponding to a time within the second media content when the second fingerprint was generated, where the first time represents a start time for a first unique media asset to exclude from presenting in the second media content. For example, the media guidance application may keep iterating through fingerprints until a match is found. The match signals the media guidance application that the time of the fingerprint within the second media asset is the start time of a unique media asset to exclude from the media content presentation.

The media guidance application may store a second time corresponding to a last fingerprint in the second subset, where the second time represents an end time for the first unique media asset to exclude from presenting in the second media content. For example, the media guidance application may iterate through each fingerprint in the second subset to determine a time stamp of the last fingerprint and set that time stamp as the end time of the excluded unique media asset.

In some embodiments, the media guidance application may present the second compilation without the excluded unique media asset by performing the following actions. The media guidance application may generate for display the second media content without a segment corresponding to the start time and the end time representing the first unique media asset. For example, the media guidance application may store time intervals for each unique media asset within the second media content to refrain from display. As the media content is being generated for display, the media guidance application may determine that a time within the media content corresponds to a start point. The media guidance application may identify, based on stored data, a corresponding end point for the unique media asset, and skip the frames between those two points. In some embodiments, the media guidance application may modify the second compilation to remove the previously viewed unique media assets. This may be useful when these media assets are stored locally for the user to consume in order to save storage space.

In some embodiments, when a second user accesses media content consumed by the first user, the media guidance application may instead of generating a fresh set of fingerprints use the fingerprints already generated for the first user. Specifically, the media guidance application may determine that a second user, different from the first user, is accessing the second media content, and in response to determining that the second user, different from the first user, is accessing the second media content, generating a pointer, in a profile associated with the second user, to the second set of fingerprints. For example, if fingerprints for a television program were already generated and stored in a first user's profile, the media guidance application may create a pointer to those fingerprints instead of generating them again.

In some embodiments, the media guidance application may, when storing, in a profile associated with the first user, the fingerprint for each media asset in the first plurality of unique media assets, perform the following actions. The media guidance application may store the fingerprint for each media asset in the first plurality of media assets at a location accessible by a plurality of users, and store, in the profile associated with the user, a link to the location accessible by a plurality of users. For example, the media guidance application may store the fingerprints on a remote server and store a pointer in the user's profile to a location on the server where the fingerprints may be accessed.

It should be noted that the methods and system described herein may be applied to playlists of media assets. For example, an editor may generate a playlist of media assets (e.g., highlights of different sporting events). Instead of stitching together the different highlights into one media asset, the editor may generate a playlist of the different clips. If the media guidance application receives a command to play the playlist, the media guidance application may apply the same methods and systems as are applied to the compilation of media assets. For example, fields 102 and 122 of FIG. 1 may store identifiers for video clips within the generated playlists and fields 104 and 124 may store fingerprints for those clips.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
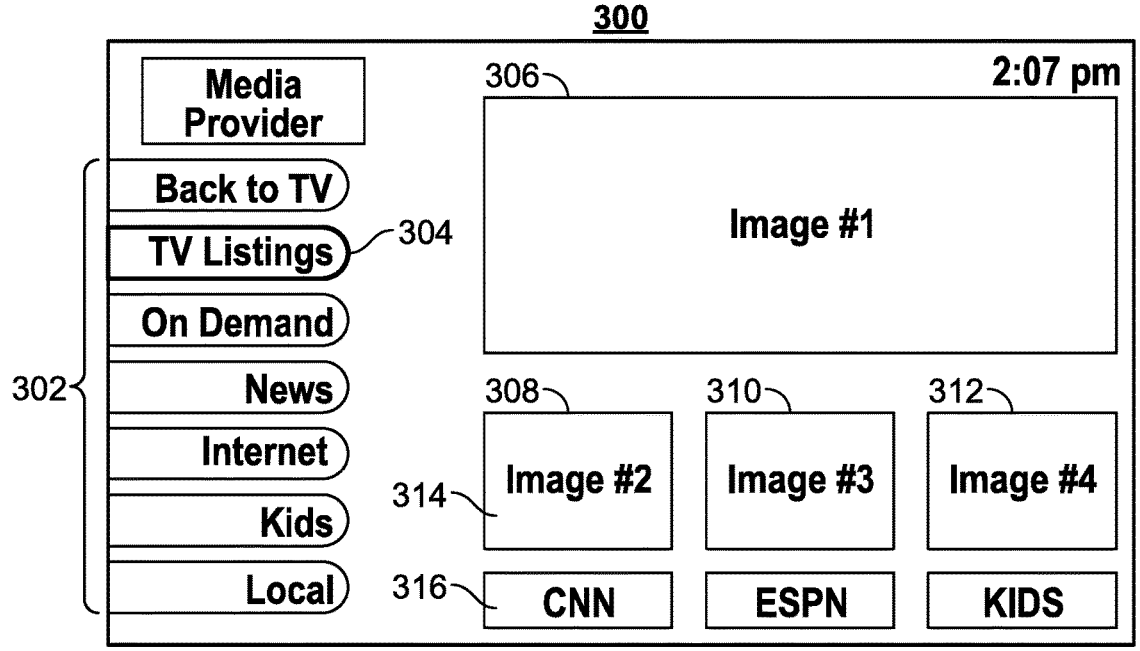
FIG. 3 shows another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
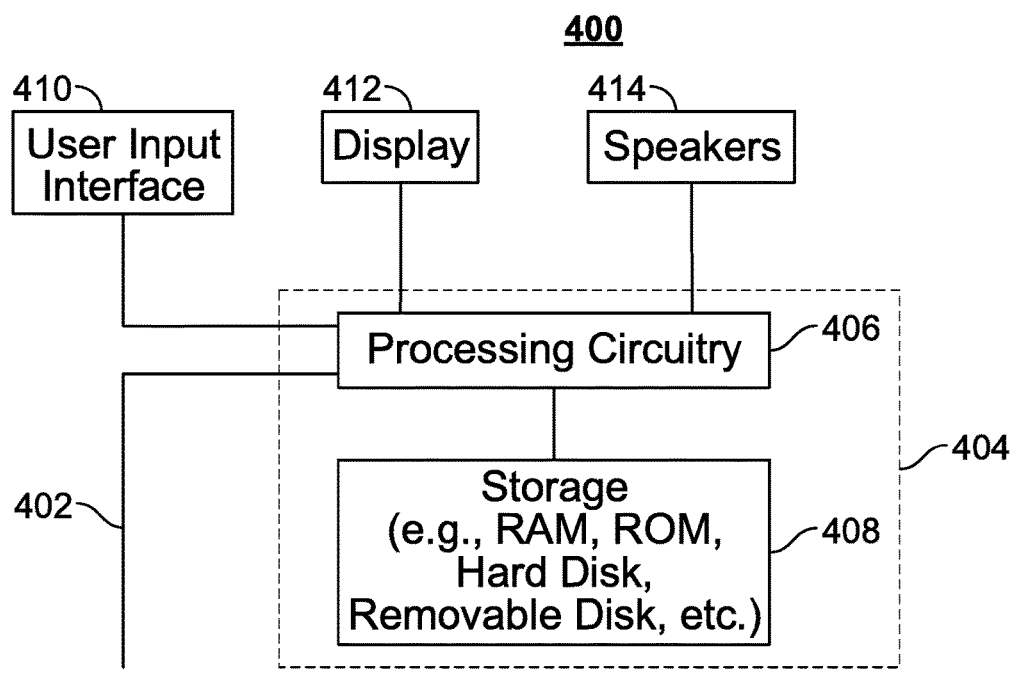
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays.

For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
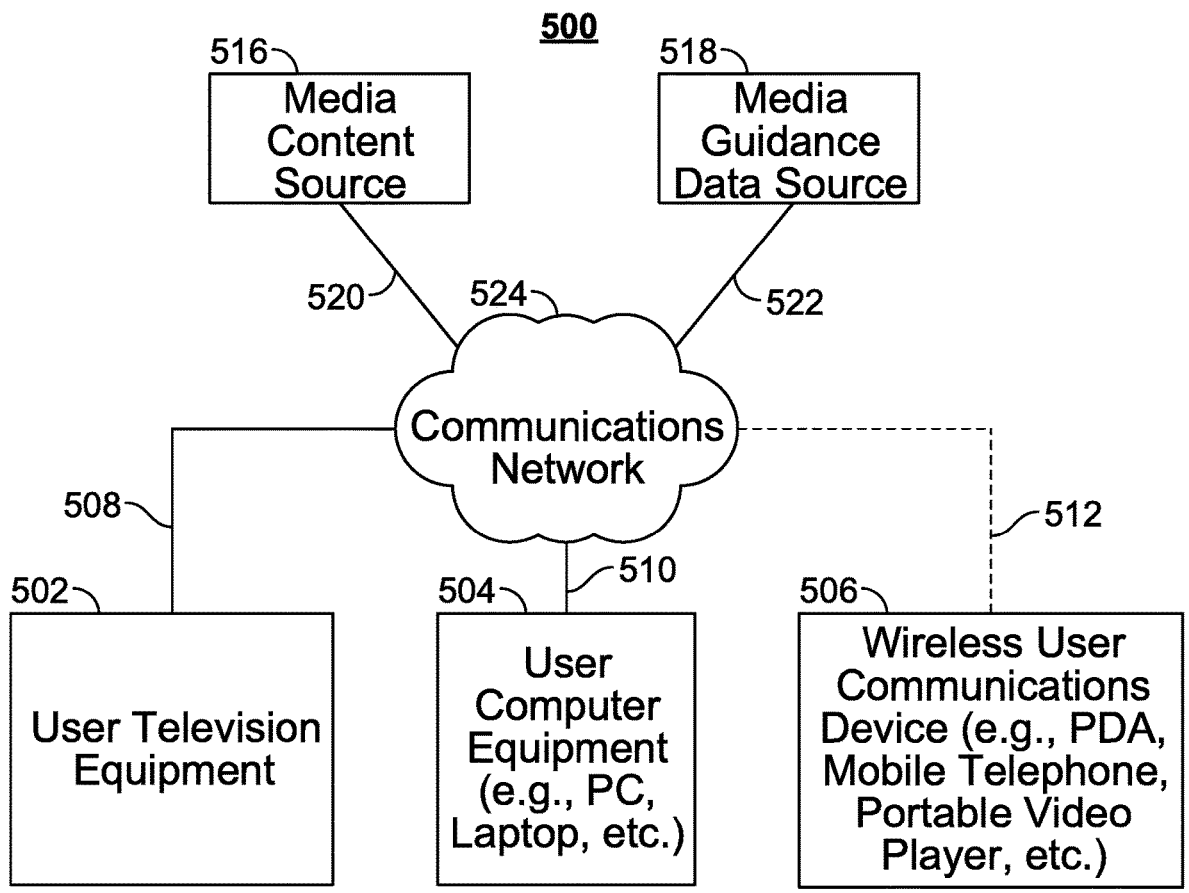
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of, for example, a first action being performed in response to a second action may include interstitial steps between the first action and the second action. As referred herein, the term "directly in response to" refers to caused by, for example, a first action being performed directly in response to a second action may not include interstitial steps between the first action and the second action.

FIG. 6 is a flowchart of illustrative actions for excluding consumed content from a content presentation, in accordance with some embodiments of the disclosure. At 602, control circuitry 404 generates a first plurality of fingerprints for a first media content consumed by a first user, where the first media content comprises a first compilation of a first plurality of unique media assets. For example, control circuitry 404 may access the first media content in storage 408 and execute and algorithm for generating a fingerprint on a specific frame at a specific time within the first media content. Additionally or alternatively, the control circuitry may execute the algorithm which generates a fingerprint based on a sound sample from a specific time within the first media content. In some embodiments, the media guidance application may access the media content at a remote server (e.g., a server associated with media content source 516 or media guidance data source 518).

At 604, control circuitry 404 stores, in a profile associated with the first user, a fingerprint for each media asset in the first plurality of unique media assets. The control circuitry may access the profile associated with the first user from storage 408. In some embodiments, the control circuitry may access the first user's profile at a remote server (e.g., server associated with media content source 516 or media guidance data source 518). The control circuitry may use an Application Program Interface ("API") to store the fingerprints in the first user's profile. The API may require a specific format of the fingerprints.

At 606, control circuitry 404 generates a second plurality of fingerprints for a second media content, where the second media content includes a second compilation of a second plurality of unique media assets different from the first plurality of unique media assets. For example, control circuitry 404 may access the second media content in storage 408 and execute an algorithm for generating a fingerprint on a specific frame at a specific time within the second media content. Additionally or alternatively, the control circuitry may execute the algorithm which generates a fingerprint based on a sound sample from a specific time within the media content. In some embodiments, the media guidance application may access the second media content at a remote server (e.g., a server associated with media content source 516 or media guidance data source 518).

At 608, control circuitry 404 compares each fingerprint in the second plurality of fingerprints with each fingerprint in the first plurality of fingerprints. The control circuitry may retrieve the first plurality of fingerprints from the user's profile (e.g., user profile located in storage 408). In some embodiments, the control circuitry may retrieve the first plurality of fingerprints from a remote server (e.g., a server associated with media content source 516 or media guidance data source 518). The control circuitry may compare the retrieved first plurality of fingerprints with a second plurality of fingerprints, which can also be retrieved from storage 408 or a remote server (e.g., a server associated with media content source 516 or media guidance data source 518).

At 610, control circuitry 404 identifies, based on the comparing, a set of unique media assets that are in both the first plurality of unique media assets and the second plurality of unique media assets. For example, the control circuitry may determine, based on which fingerprints match between the compilations, that the user has consumed and the compilation that is to be consumed, the start time and end time of each unique media asset that has been consumed and exclude that media asset from the presentation of the compilation. The control circuitry may store the start times and the end times within the presentation to be excluded in the user's profile, linking the start and end times with the specific compilations for which they are to be used. The control circuitry may store this information in storage 408 and/or at a remote server (e.g., server associated with media content source 516 and/or media guidance data source 518).

At 612, control circuitry 408 generates for display the second media content without the set of unique media assets that are in both the first plurality of unique media assets and the second plurality of unique media assets. The control circuitry may retrieve the second media content and search the user's profile for segments to exclude from the second media content. The control circuitry may search the user's profile for an identifier associated with the second media content. If the control circuitry locates the identifier, the control circuitry may retrieve the start times and end times that are associated with the second media content to be excluded. As the control circuitry generates for display the second media content, the control circuitry may skip over the frames at the start time until the end time for each retrieved start and end time pair.

Figure 7:
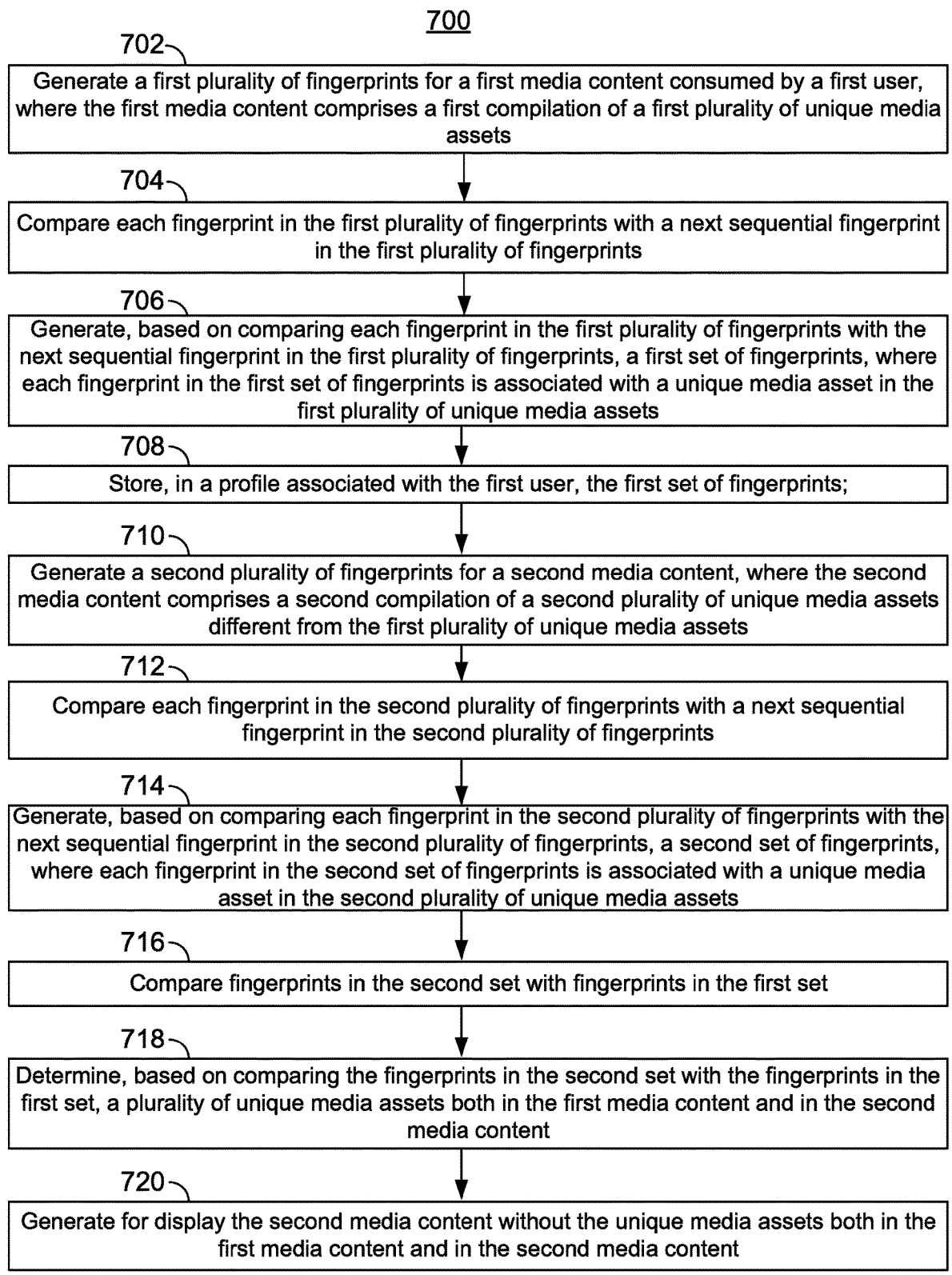
FIG. 7 is another flowchart of illustrative actions for excluding consumed content from a content presentation, in accordance with some embodiments of the disclosure.

FIG. 7 is another flowchart of illustrative actions for excluding consumed content from a content presentation, in accordance with some embodiments of the disclosure. At 702, control circuitry 404 generates a first plurality of fingerprints for a first media content consumed by a first user, where the first media content comprises a first compilation of a first plurality of unique media assets. For example, control circuitry 404 may access the first media content in storage 408 and execute an algorithm for generating a fingerprint on a specific frame at a specific time within the first media content. Additionally or alternatively, the control circuitry may execute the algorithm which generates a fingerprint based on a sound sample from a specific time within the first media content. In some embodiments, the media guidance application may access the media content at a remote server (e.g., a server associated with media content source 516 or media guidance data source 518).

At 704, control circuitry 404 compares each fingerprint in the first plurality of fingerprints with a next sequential fingerprint in the first plurality of fingerprints. The control circuitry may store the first plurality of fingerprints in storage 408. Alternatively or additionally, the control circuitry may store the first plurality of fingerprints at a remote server (e.g., a server associated with media content source 516 and/or media guidance data source 518). The control circuitry may retrieve the fingerprints from storage and perform a comparison operation via a routine.

At 706, control circuitry 404 generates, based on comparing each fingerprint in the first plurality of fingerprints with the next sequential fingerprint in the first plurality of fingerprints, a first set of fingerprints, where each fingerprint in the first set of fingerprints is associated with a unique media asset in the first plurality of unique media assets. The control circuitry may execute a routine to iterate through each pair of sequential fingerprints and determine whether each fingerprint in the pair matches. If the fingerprints match, the control circuitry may determine that they correspond to the same unique media asset; if not, the control circuitry may determine that the fingerprints correspond to a different unique media asset. The control circuitry may store the fingerprints for each unique media asset together so they can be retrieved separately from fingerprints from other unique media assets.

At 708, control circuitry 404 stores, in a profile associated with the first user, the first set of fingerprints. The control circuitry may access the profile associated with the first user from storage 408. In some embodiments, the control circuitry may access the first user's profile at a remote server (e.g., a server associated with media content source 516 or media guidance data source 518). The control circuitry may use an API to store the fingerprints in the first user's profile. The API may require a specific format of the fingerprints.

At 710, control circuitry 404 generates a second plurality of fingerprints for a second media content, where the second media content includes a second compilation of a second plurality of unique media assets different from the first plurality of unique media assets. For example, control circuitry 404 may access the second media content in storage 408 and execute an algorithm for generating a fingerprint on a specific frame at a specific time within the second media content. Additionally or alternatively, the control circuitry may execute the algorithm which generates a fingerprint based on a sound sample from a specific time within the media content. In some embodiments, the media guidance application may access the second media content at a remote server (e.g., a server associated with media content source 516 or media guidance data source 518).

At 712, control circuitry 404 compares each fingerprint in the second plurality of fingerprints with a next sequential fingerprint in the second plurality of fingerprints. The control circuitry may store the second plurality of fingerprints in storage 408. Alternatively or additionally, the control circuitry may store the second plurality of fingerprints at a remote server (e.g., a server associated with media content source 516 and/or media guidance data source 518). The control circuitry may retrieve the fingerprints from storage and perform a comparison operation via a routine.

At 714, control circuitry 404 generates, based on comparing each fingerprint in the second plurality of fingerprints with the next sequential fingerprint in the second plurality of fingerprints, a second set of fingerprints, where each fingerprint in the second set of fingerprints is associated with a unique media asset in the second plurality of unique media assets. The control circuitry may execute a routine to iterate through each pair of sequential fingerprints and determine whether each fingerprint in the pair matches. If the fingerprints match, the control circuitry may determine that they correspond to the same unique media asset; if not, the control circuitry may determine that the fingerprints correspond to a different unique media asset. The control circuitry may store the fingerprints for each unique media asset together so they can be retrieved separately from fingerprints from other unique media assets.

At 716, control circuitry 404 compares fingerprints in the second set with fingerprints in the first set. The control circuitry may retrieve the fingerprints for the second media content from storage 408 or a remote server (e.g., a remote server associated with media content source 516 or media guidance data source 518). The control circuitry may retrieve the fingerprints for the first media content from storage 408 or a remote server (e.g., a remote server associated with media content source 516 or media guidance data source 518). It should be noted that the control circuitry may retrieve other fingerprints from the user's profile that are associated with unique media assets consumed in the past. Thus, the control circuitry may be comparing many sets of fingerprints (e.g., a set of fingerprints for each unique media asset that the user has consumed). The control circuitry may perform the comparison operation via a routine through an API.

At 718, control circuitry 404 determines, based on comparing the fingerprints in the second set with the fingerprints in the first set, a plurality of unique media assets both in the first media content and in the second media content. For example, the control circuitry may determine, based on which fingerprints match between the compilations that the user has consumed and the compilation that is to be consumed, the start time and end time of each unique media asset that has been consumed and exclude that media asset from the presentation of the compilation. The control circuitry may store the start times and the end times within the presentation to be excluded in the user's profile, linking the start and end times with the specific compilations for which they are to be used. The control circuitry may store this information in storage 408 and/or at a remote server (e.g., a server associated with media content source 516 and/or media guidance data source 518).

At 720, control circuitry 404 generates for display the second media content without the unique media assets both in the first media content and in the second media content. The control circuitry may retrieve the second media content and search the user's profile for segments to exclude from the second media content. The control circuitry may search the user's profile for an identifier associated with the second media content. If the control circuitry locates the identifier, the control circuitry may retrieve the start times and end times that are associated with the second media content to be excluded. As the control circuitry generates for display the second media content, the control circuitry may skip over the frames at the start time until the end time for each retrieved start and end time pair.

Figure 8:
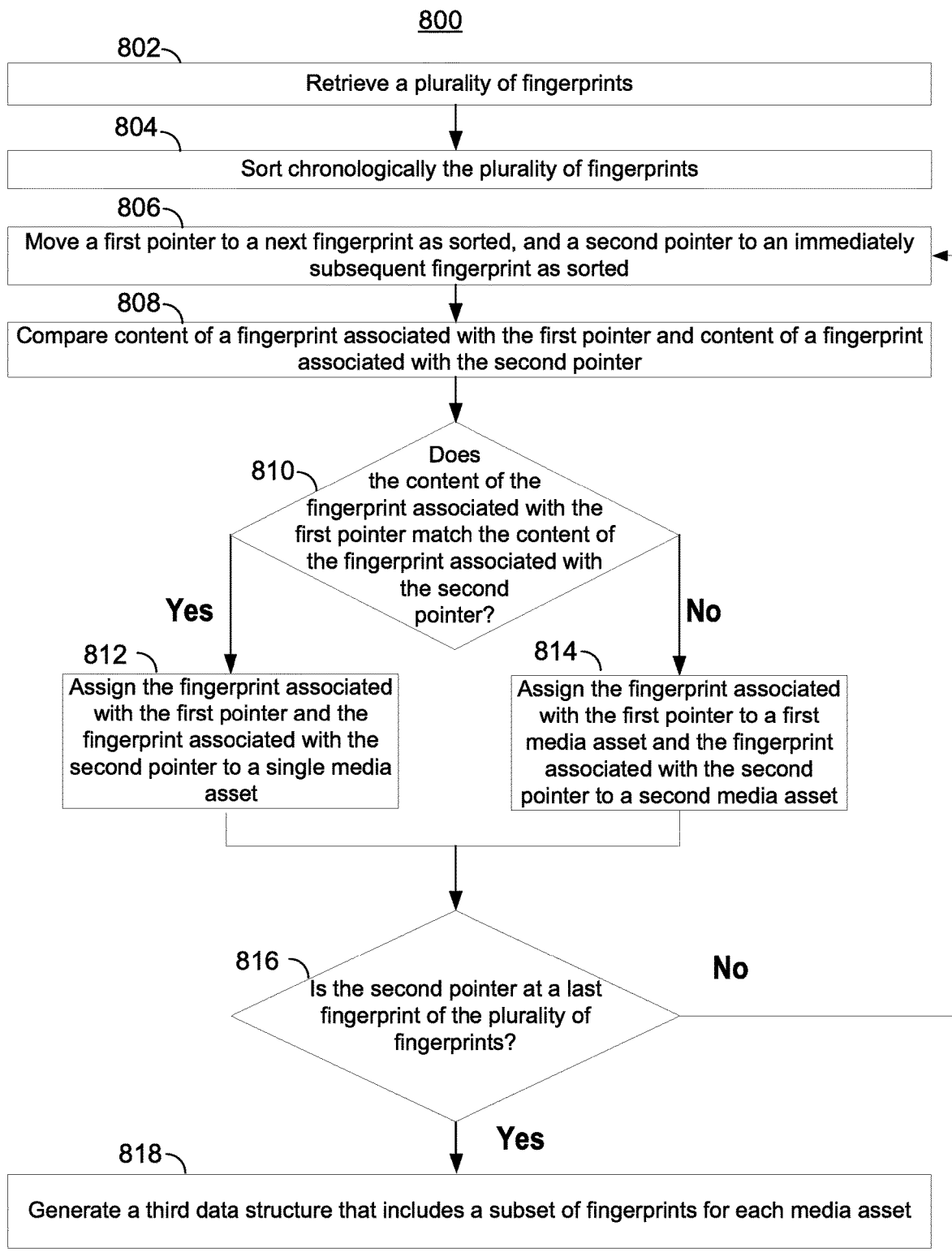
FIG. 8 is a flowchart of illustrative actions for comparing sequential fingerprints, in accordance with some embodiments of the disclosure.

FIG. 8 is a flowchart of illustrative actions for comparing sequential fingerprints, in accordance with some embodiments of the disclosure. At 802, control circuitry 404 retrieves a plurality of fingerprints. The control circuitry may retrieve the first plurality of fingerprints or the second plurality of fingerprints for comparison. The retrieval may be performed from storage 408 and/or from a remote server (e.g., a remote server associated with media content source 516 and/or media guidance data source 518). The control circuitry may store the retrieved fingerprints in a data structure in, for example, random access memory. The data structure may be traversable so that the control circuitry may iterate through the data structure.

At 804, control circuitry 404 sorts chronologically the plurality of fingerprints. In some embodiments, the plurality of retrieved fingerprints may already be sorted in chronological order because of the method of generating fingerprints (i.e., the fingerprints are generated in chronological order and stored that way). Thus, this action may not be necessary. However, the fingerprints should be sorted in chronological order before the comparison begins.

At 806, control circuitry 404 moves a first pointer to a next fingerprint as sorted, and a second pointer to an immediately subsequent fingerprint as sorted. If this is the first iteration of the comparison, the control circuitry may move the first pointer to the first fingerprint in the data structure and the second pointer to the second fingerprint in the data structure. As the control circuitry iterates through each fingerprint, the control circuitry may move the first pointer to each sequential fingerprint starting from the first fingerprint and the second pointer to each sequential fingerprint starting from the second fingerprint. The pointers may be implemented as loops. Thus, the control circuitry may be programmed to execute two loops (one for each pointer).

At 808, control circuitry 404 compares content of a fingerprint associated with the first pointer and content of a fingerprint associated with the second pointer. The comparison may be performed by a pre-programmed routine and may output the result. At 810, control circuitry 404 determines whether the content of the fingerprint associated with the first pointer matches the content of the fingerprint associated with the second pointer. For example, the control circuitry may query the result of the routine. If the content of the fingerprint associated with the first pointer matches the content of the fingerprint associated with the second pointer, process 800 moves to action 812, where control circuitry 404 assigns the fingerprint associated with the first pointer and the fingerprint associated with the second pointer to a single media asset. For example, control circuitry 404 may copy both fingerprints into a data structure associated with one unique media asset. The data structure may be stored in storage 408. In some embodiments, the control circuitry may store the data structure on a remote server (e.g., a remote server associated with media content source 516 and/or media guidance data source 518). In some embodiments, the control circuitry may create a link in a data structure associated with the unique media asset to the fingerprint so that the fingerprint may be referenced from the data structure.

If the content of the fingerprint associated with the first pointer does not match the content of the fingerprint associated with the second pointer, process 800 moves to action 814, where control circuitry 404 assigns the fingerprint associated with the first pointer to a first media asset and the fingerprint associated with the second pointer to a second media asset. For example, control circuitry 404 may copy each fingerprint into a respective data structure associated with a respective unique media asset. The data structures may be stored in storage 408. In some embodiments, the control circuitry may store the data structures on a remote server (e.g., a remote server associated with media content source 516 and/or media guidance data source 518). In some embodiments, the control circuitry may create a link in each respective data structure associated with each unique media asset to the respective fingerprint so that the respective fingerprints may be referenced from the respective data structures.

At 816, control circuitry 404 determines whether the second pointer is at a last fingerprint of the plurality of fingerprints. If control circuitry 404 determines that the second pointer is at a last fingerprint of the plurality of fingerprints, process 800 moves to action 818 where control circuitry 404 generates a third data structure that includes a subset of fingerprints for each media asset. For example, the control circuitry may generate a multi-dimensional array that includes multiple fingerprints for each unique media asset. Thus, one dimension of the array may include identifiers of the unique media assets, while a second dimension may include corresponding fingerprints.

Figure 9:
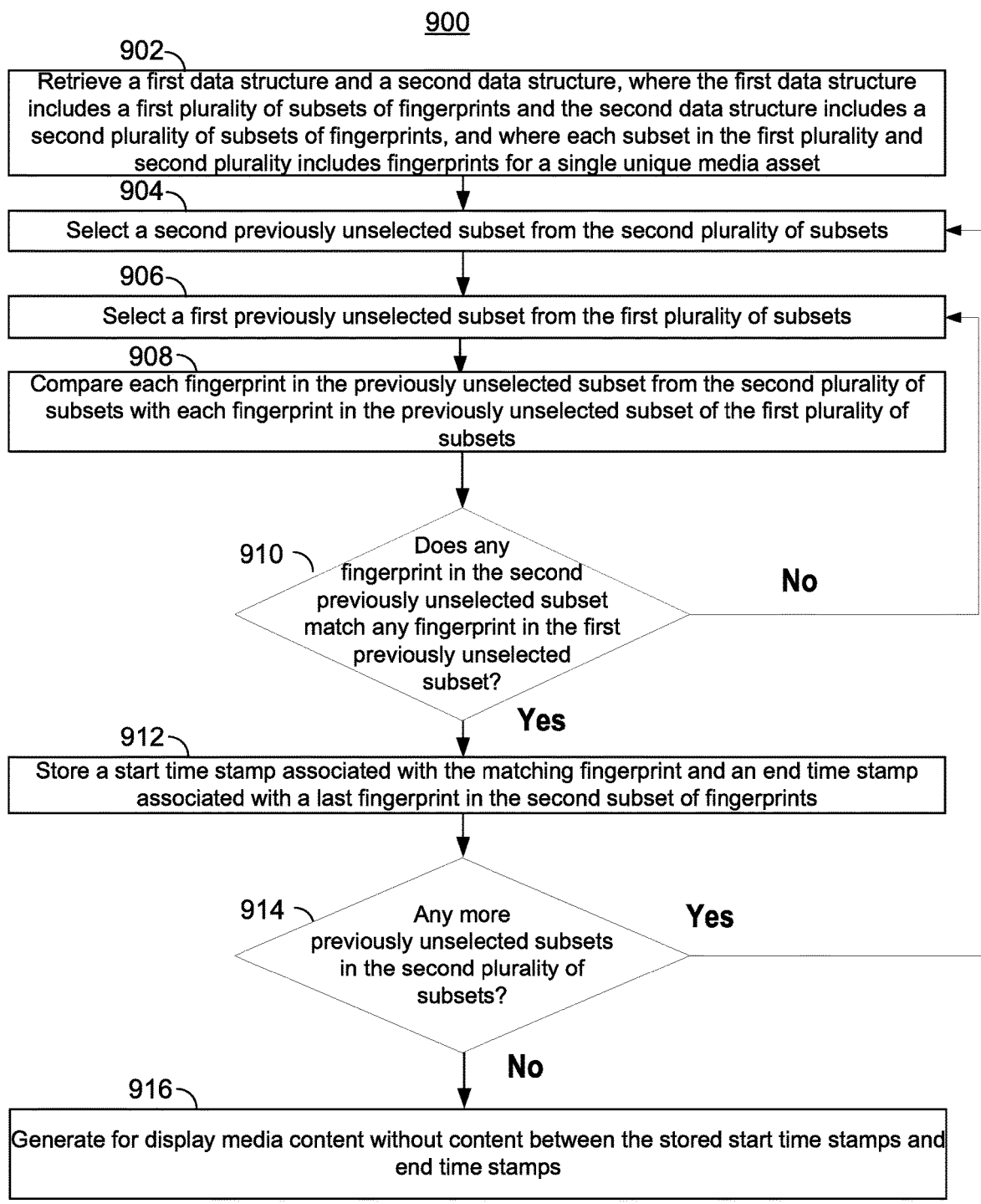
FIG. 9 is a flowchart of illustrative actions for determining which unique media assets to exclude from media content presentation, in accordance with some embodiments of the disclosure.

FIG. 9 is a flowchart of illustrative actions for determining which unique media assets to exclude from media content presentation, in accordance with some embodiments of the disclosure. At 902, control circuitry 404 retrieves a first data structure and a second data structure, where the first data structure includes a first plurality of subsets of fingerprints and the second data structure includes a second plurality of subsets of fingerprints, and where each subset in the first plurality and second plurality includes fingerprints for a single unique media asset. For example, the control circuitry may retrieve each data structure from storage 408. In some embodiments, the control circuitry may retrieve the data structures from a remote server (e.g., a remote server associated with media content source 516 or media guidance data source 518).

At 904, control circuitry 404 selects a second previously unselected subset from the second plurality of subsets. For example, the control circuitry may iterate through each subset of fingerprints in the second plurality in order to find matching fingerprints for consumed unique media assets. The control circuitry may execute a loop through a data structure associated with the second plurality of fingerprints selecting one subset at a time for comparison. At 906, control circuitry 404 selects a first previously unselected subset from the first plurality of subsets. For example, the control circuitry may iterate through each subset of fingerprints in the first plurality that corresponds to consumed unique media assets. The control circuitry may execute a loop through a data structure associated with the first plurality of fingerprints selecting one subset at a time for comparison. It should be noted that in some embodiments, the control circuitry may iterate through more than just the first plurality of subsets. The control circuitry may store (e.g., in storage 408 or on a remote server) identifiers of unique media assets that the user has consumed together with fingerprints corresponding to those unique media assets (these may belong to various compilations consumed by the user). The control circuitry may iterate through those identifiers in order to compare their fingerprints with fingerprints of a media content about to be consumed.

At 908, control circuitry 404 compares each fingerprint in the previously unselected subset from the second plurality of subsets with each fingerprint in the previously unselected subset of the first plurality of subsets. The control circuitry may iterate through each subset and compare the fingerprints in the two subsets to determine whether any of the fingerprints in the subsets match. The control circuitry may execute a routine that enables the comparison. At 910, control circuitry 404 determines whether any fingerprint in the second previously unselected subset matches any fingerprint in the first previously unselected subset. If the control circuitry determines that no fingerprint in the second previously unselected subset matches a fingerprint in the first previously unselected subset, process 900 moves to action 906, where the control circuitry selects a next subset of fingerprints associated with another unique media asset that the user has consumed and starts the comparison with the newly selected set (e.g., from the first plurality of subsets). If control circuitry 404 determines that a fingerprint in the second previously unselected subset matches a fingerprint in the first previously unselected subset, process 900 moves to action 912.

At 912, control circuitry 404 stores a start time stamp associated with the matching fingerprint and an end time stamp associated with a last fingerprint in the second subset of fingerprints. The control circuitry may create an entry in the user's profile for the second media content or access an already existing entry for the second media content. The control circuitry may store an identifier associated with the unique media asset that has a matching fingerprint and a start time within the second media content corresponding to a time with the second media content when the matching fingerprint was generated. The control circuitry may store an end time in the same location that is associated with the last fingerprint in the second subset.

At 914, control circuitry 404 determines whether there are any more previously unselected subsets in the second plurality of subsets. The control circuitry may make the determination by making an API call that can traverse a data structure that stores the subset to determine whether the last subset has been processed. If the control circuitry determines that there are more previously unselected subsets in the second plurality of subsets, process 900 moves to action 904, where control circuitry 404 selects a new previously unselected subset of fingerprints so that this subset can be checked as to whether the corresponding unique media asset was consumed by the user.

If the control circuitry determines that there are no more previously unselected subsets in the second plurality of subsets, process 900 moves to action 916, where control circuitry 404 generates for display media content without content between the stored start time stamps and end time stamps. The control circuitry may retrieve all the start and end time stamps and monitor the media content presentation elapsed time. When the elapsed time matches a first start time, the control circuitry may skip (e.g., not generate for display the frames or sound of a video) until the end time and continue the presentation at the end time. The control circuitry may repeat this process for each pair of start and end times until the end of the second media content.

Figure 10:
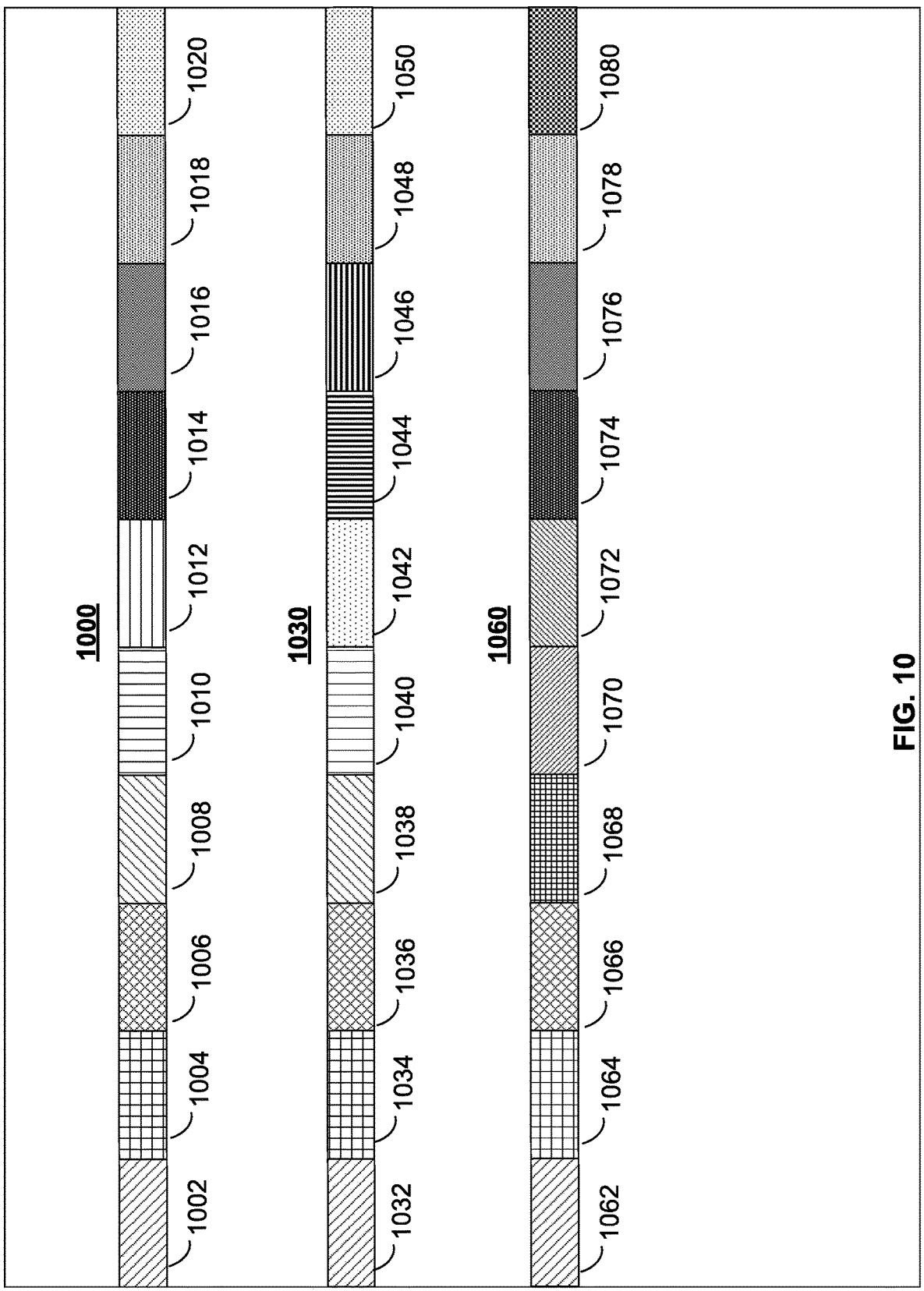
FIG. 10 is an illustrative example of three compilations that include various unique media assets.

FIG. 10 is an illustrative example of three compilations that include various unique media assets. Compilation 1000 may represent a compilation consumed before compilation 1030 and compilation 1030 may represent a compilation consumed before compilation 1060, but after compilation 1000. Compilation 1000 may include ten unique media assets, including unique media assets 1002, 1004, 1006, 1008, 1010, 1012, 1014, 1016, 1018, and 1020, as illustrated by different shadings. As the user consumes compilation 1000, the media guidance application may generate fingerprints of the ten unique media assets. In some embodiments, the unique media assets may be different scenes. These scenes may be from the same media asset or stitched from different media assets (e.g., different sports highlights). In some embodiments, the media guidance application may store multiple fingerprints for each unique media asset or scene. However, in some embodiments, the media guidance application may store one fingerprint for each unique media asset or scene. The media guidance application may receive a command to consume compilation 1030 after compilation 1000 is consumed. The media guidance application may generate fingerprints of each unique media asset or scene of compilation 1030 as described above.

In some embodiments, the media guidance application may iterate through each unique media asset to store one fingerprint for each unique media asset or scene of compilation 1030. The media guidance application may determine that unique media assets 1032, 1034, 1036, 1038, 1040, 1048, and 1050 are the same as unique media assets 1002, 1004, 1006, 1008, 1010, 1018, and 1020, respectively, as indicated by the shading of each unique media asset. When the media guidance application plays compilation 1030, the media guidance application may skip these unique media assets or scenes as they have already been consumed by the user while consuming compilation 1000. Thus, the media guidance application may only play unique media assets 1042, 1044, and 1046.

In some embodiments, the media guidance application may determine that unique media assets 1032, 1034, 1036, 1038, and 1040 should have fingerprints stored as one unique media asset because they have previously been played together in the same sequence. Thus, the media guidance application may store fingerprints for those media assets in the same manner as storing one or more fingerprints for one unique media asset. Similarly, the media guidance application may store fingerprints in the same manner for unique media assets 1048 and 1050 because they have previously been played together in the same sequence.

The media guidance application may receive a command to play compilation 1060. The media guidance application may determine, by using fingerprints as described above, that unique media assets or scenes 1062, 1064, and 1066 are the same as unique media assets or scenes 1002, 1004, and 1006, respectively. The media guidance application may skip those scenes when playing compilation 1060. In some embodiments, the media guidance application may store a unique fingerprint or fingerprints representing a unique media asset that includes unique media assets 1062, 1064, and 1066 because they have been played together in sequence. The media guidance application may skip playing those unique media assets and play unique media assets 1070 and 1072. The media guidance application may determine, using fingerprints as described above, that unique media assets 1074, 1076, and 1078 have been consumed before (i.e., in compilation 1000 as illustrated by the shading) and skip those media assets when playing compilation 1060. The media guidance application may play unique media asset 1080.

The processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for excluding consumed content from a content presentation, the method comprising:
   generating, using control circuitry, a first plurality of fingerprints for a first media content wherein the first media content comprises a first compilation of media assets;
   creating, using control circuitry, based on a comparison of each fingerprint in the first plurality of fingerprints with a next sequential fingerprint in the first plurality of fingerprints, a first set of fingerprints comprising one fingerprint from each sequential pair of identical fingerprints in the first plurality of fingerprints;
   generating, using control circuitry, a second plurality of fingerprints for a second media content, wherein the second media content comprises a second compilation of media assets different from the first compilation of media assets;
   comparing, using control circuitry, fingerprints in the second plurality of fingerprints with fingerprints in the first set of fingerprints;
   determining, using control circuitry, based on comparing the second plurality of fingerprints with the first plurality of fingerprints, a set of media assets that are both in the first media content and in the second media content; and
   generating, using control circuitry, for display the second media content without the set of media assets.

2. The method of claim 1, further comprising:
   determining that a user finished consuming the second media asset; and
   in response to determining that the user finished consuming the second media asset, storing a second set of fingerprints in the profile associated with the user, wherein the second set of fingerprints comprises a set of fingerprints associated with the second media content without the set of media assets.

3. The method of claim 2, further comprising:
   determining that a second user is accessing the second media content; and
   in response to determining that the second user is accessing the second media content, generating a pointer, in a profile associated with the second user, to the second plurality of fingerprints.

4. The method of claim 1, wherein generating the first plurality of fingerprints for the first media content comprises:
   determining, based on a duration associated with the first media content, a plurality of points within the first media content for generating the plurality of fingerprints; and
   generating each fingerprint in the plurality of fingerprints at a corresponding point of the plurality of points.

5. The method of claim 1, further comprising:
   retrieving a first fingerprint from the first plurality of fingerprints and a second fingerprint from the first plurality of fingerprints;
   comparing content associated with the first fingerprint with content associated with the second fingerprint;
   determining whether a predefined amount of the content associated with the first fingerprint matches the predefined amount of the content associated with the second fingerprint;
   in response to determining that the predefined amount of the content associated with the first fingerprint matches the predefined amount of the content associated with the second fingerprint, assigning the first fingerprint and the second fingerprint to a first media asset; and in response to determining that the predefined amount of the content associated with the first fingerprint does not match the predefined amount of the content associated with the second fingerprint, assigning the first fingerprint to a first media asset and the second fingerprint to a second media asset.

6. The method of claim 1, wherein determining the set of media assets that are both in the first media content and in the second media content comprises:

determining that a first fingerprint in the first plurality of fingerprints matches a second fingerprint in the second plurality of fingerprints;

storing a start time of the content associated with the second fingerprint, wherein the start time demarcates a start of content exclusion in the second media content; and storing an end time of the content associated with the second fingerprint, wherein the end time demarcates an end of content exclusion in the second media content.

7. The method of claim 6, wherein generating for display the second media content without the set of media assets both in the first media content and in the second media content comprises generating for display the second media content without a segment contained by the start time and the end time.

8. The method of claim 1, further comprising:

storing, in a profile associated with the user, the first plurality of fingerprints for the first media content;

storing the fingerprint for each media asset in the first compilation of media assets at a location accessible by a plurality of users; and storing, in the profile associated with the first user, a link to the location accessible by the plurality of users.

9. A system for excluding consumed content from a content presentation, the system comprising:

storage; and control circuitry configured to:

generate a first plurality of fingerprints for a first media content wherein the first media content comprises a first compilation of media assets;

create, based on a comparison of each fingerprint in the first plurality of fingerprints with a next sequential fingerprint in the first plurality of fingerprints, a first set of fingerprints comprising one fingerprint from each sequential pair of identical fingerprints in the first plurality of fingerprints;

generate a second plurality of fingerprints for a second media content, wherein the second media content comprises a second compilation of media assets different from the first compilation of media assets;

compare fingerprints in the second plurality of fingerprints with fingerprints in the first set of fingerprints;

determine, based on comparing the second plurality of fingerprints with the first plurality of fingerprints, a set of media assets that are both in the first media content and in the second media content; and generate for display the second media content without the set of media assets.

10. The system of claim 9, wherein the control circuitry is further configured to:

determine that a user finished consuming the second media asset; and in response to determining that the user finished consuming the second media asset, store a second set of fingerprints in the profile associated with the user, wherein the second set of fingerprints comprises a set of fingerprints associated with the second media content without the set of media assets.

11. The system of claim 10, wherein the control circuitry is further configured to:

determine that a second user is accessing the second media content; and in response to determining that the second user is accessing the second media content, generate a pointer, in a profile associated with the second user, to the second plurality of fingerprints.

12. The system of claim 9, wherein the control circuitry is configured, when generating the first plurality of fingerprints for the first media content, to:

determine, based on a duration associated with the first media content, a plurality of points within the first media content for generating the plurality of fingerprints; and generate each fingerprint in the plurality of fingerprints at a corresponding point of the plurality of points.

13. The system of claim 9, wherein the control circuitry is further configured to:

retrieve a first fingerprint from the first plurality of fingerprints and a second fingerprint from the first plurality of fingerprints;

compare content associated with the first fingerprint with content associated with the second fingerprint;

determine whether a predefined amount of the content associated with the first fingerprint matches the predefined amount of the content associated with the second fingerprint;

in response to determining that the predefined amount of the content associated with the first fingerprint matches the predefined amount of the content associated with the second fingerprint, assign the first fingerprint and the second fingerprint to a first media asset; and in response to determining that the predefined amount of the content associated with the first fingerprint does not match the predefined amount of the content associated with the second fingerprint, assign the first fingerprint to a first media asset and the second fingerprint to a second media asset.

14. The system of claim 9, wherein the control circuitry is configured, when determining the set of media assets that are both in the first media content and in the second media content, to:

determine that a first fingerprint in the first plurality of fingerprints matches a second fingerprint in the second plurality of fingerprints;

store a start time of the content associated with the second fingerprint, wherein the start time demarcates a start of content exclusion in the second media content; and store an end time of the content associated with the second fingerprint, wherein the end time demarcates an end of content exclusion in the second media content.

15. The system of claim 14, wherein the control circuitry is configured, when generating for display the second media content without the set of media assets both in the first media content and in the second media content, to generate for display the second media content without a segment contained by the start time and the end time.

16. The system of claim 9, wherein the control circuitry is further configured to:

store, in a profile associated with the user, the first plurality of fingerprints for the first media content;

store the fingerprint for each media asset in the first compilation of media assets at a location accessible by a plurality of users; and
store, in the profile associated with the first user, a link to the location accessible by the plurality of users.

\* \* \* \* \*